(12) United States Patent
Shen et al.

(10) Patent No.: US 11,727,927 B2
(45) Date of Patent: Aug. 15, 2023

(54) VIEW-BASED VOICE INTERACTION METHOD, APPARATUS, SERVER, TERMINAL AND MEDIUM

(71) Applicant: BAIDU ONLINE NETWORK TECHNOLOGY (BEIJING) CO., LTD., Beijing (CN)

(72) Inventors: Zhou Shen, Beijing (CN); Dai Tan, Beijing (CN); Sheng Lv, Beijing (CN); Kaifang Wu, Beijing (CN); Yudong Li, Beijing (CN)

(73) Assignee: BAIDU ONLINE NETWORK TECHNOLOGY (BEIJING) CO., LTD., Beijing (CN)

(*) Notice: Subject to any disclaimer, the term of this patent is extended or adjusted under 35 U.S.C. 154(b) by 180 days.

(21) Appl. No.: 16/888,426

(22) Filed: May 29, 2020

(65) Prior Publication Data

US 2020/0294505 A1 Sep. 17, 2020

Related U.S. Application Data

(63) Continuation of application No. PCT/CN2019/072339, filed on Jan. 18, 2019.

(30) Foreign Application Priority Data

May 23, 2018 (CN) .......................... 201810501073.7

(51) Int. Cl.
   *G10L 15/22* (2006.01)
   *G10L 15/18* (2013.01)
   *G10L 15/26* (2006.01)
   *G10L 15/30* (2013.01)

(52) U.S. Cl.
   CPC .......... *G10L 15/22* (2013.01); *G10L 15/1815* (2013.01); *G10L 15/26* (2013.01); *G10L 15/30* (2013.01); *G10L 2015/223* (2013.01)

(58) Field of Classification Search
   CPC ..... G10L 15/00; G10L 15/22; G10L 15/1815; G10L 15/26; G10L 15/30; G10L 2015/223; G06F 3/00; G06F 3/167
   See application file for complete search history.

(56) References Cited

U.S. PATENT DOCUMENTS

| | | | | |
|---|---|---|---|---|
| 2004/0034527 A1* | 2/2004 | Hennecke | ............. | G10L 15/187 704/231 |
| 2010/0169098 A1* | 7/2010 | Patch | ............. | 704/275 |
| 2015/0066496 A1* | 3/2015 | Deoras | ............. | G06N 3/0454 704/232 |
| 2016/0132291 A1* | 5/2016 | Bai | .......... | G06F 9/453 715/728 |
| 2016/0351194 A1* | 12/2016 | Gao | ......... | G10L 15/22 |
| 2018/0232662 A1* | 8/2018 | Solomon | ............ | G08B 13/1427 |
| 2019/0179607 A1* | 6/2019 | Thangarathnam | .......................... | G10L 15/1815 |
| 2019/0279615 A1* | 9/2019 | Ben-Dor | ............. | H04L 41/0893 |

FOREIGN PATENT DOCUMENTS

| | | |
|---|---|---|
| CN | 103544954 A | 1/2014 |
| CN | 105161106 A | 12/2015 |
| CN | 106486118 A | 3/2017 |
| CN | 107180631 A | 9/2017 |
| CN | 107871496 A | 4/2018 |
| CN | 107910003 A | 4/2018 |
| CN | 107992587 A | 5/2018 |
| CN | 108062212 A | 5/2018 |
| JP | 2003044093 A | 2/2003 |

OTHER PUBLICATIONS

Chinese Patent Application No. 201810501073.7, First Office Action dated Apr. 23, 2020, 11 pages.
Chinese Patent Application No. 201810501073.7, English translation of First Office Action dated Apr. 23, 2020, 13 pages.
Japanese Patent Application No. 2020-502486, Office Action dated Jan. 26, 2021, 4 pages.
Japanese Patent Application No. 2020-502486, English translation of Office Action dated Jan. 26, 2021, 4 pages.

* cited by examiner

*Primary Examiner* — Paras D Shah
*Assistant Examiner* — Sean E Serraguard
(74) *Attorney, Agent, or Firm* — Cozen O'Connor (57) ABSTRACT

Embodiments of the present disclosure disclose a view-based voice interaction method, an apparatus, a server, a terminal and a medium. The method includes: obtaining voice information of a user and voice-action description information of a voice-operable element in a currently displayed view on a terminal; obtaining operational intention of the user by performing semantic recognition on the voice information of the user according to view description information of the voice-operable element; locating a sequence of actions matched with the operational intention of the user in the voice-action list according to the voice-action description information; and delivering the sequence of actions to the terminal for performing.

9 Claims, 7 Drawing Sheets

VIEW-BASED VOICE INTERACTION METHOD, APPARATUS, SERVER, TERMINAL AND MEDIUM

CROSS REFERENCE TO RELATED APPLICATIONS

The present application is a continuation of International Patent Application No. PCT/CN2019/072339 filed Jan. 18, 2019, which claims priority to Chinese Patent Application No. 201810501073.7, filed with the State Intellectual Property Office of P. R. China on May 23, 2018, the disclosures of which are incorporated herein by reference.

TECHNICAL FIELD

Embodiments of the present disclosure relate to a field of computer technology, for example, to a view-based voice interaction method, an apparatus, a server, a terminal and a medium.

BACKGROUND

With the development of artificial intelligence, voice interaction becomes a very competitive interaction manner. For Internet products, combining traditional interaction schemes with the voice interaction may bring better experiences to users.

However, conventional voice interaction methods may suffer from the following drawbacks.

1) Functions of the voice interaction and the service logics of a product are closely coupled with each other, and could not be maintained separately.

2) Every developer needs to pay attention to the whole process of the voice interaction and to implement relevant details and processes by himself/herself, which make it difficult to unify functions implemented through different voice interaction development programs.

3) The development process of voice interaction could not be standardized, such that the voice interaction could not be rapidly expanded to different applications.

SUMMARY

The following content is a summary of the subjected matter which will be described in detail hereafter. The summary is not intent to limit protection extents of the attached claims.

Embodiments of the present disclosure provide a view-based voice interaction method, an apparatus, a server, a terminal and a medium, for solving problems such as high degree of coupling between the functions of voice interaction and the service logics of a product, lack of uniformity in the development of the functions of voice interaction, and poor generality.

Embodiments of the present disclosure provide a view-based voice interaction method, which is applied to a server. The method comprises:

obtaining voice information of a user and voice-action description information of a voice-operable element in a currently displayed view on a terminal, the voice-action description information including a voice-action list and configuration information of each voice-action in the voice-action list, and the voice-action being configured to describe a voice operation to be performed on an element in the view;

obtaining operational intention of the user by performing semantic recognition on the voice information according to view description information of the voice-operable element;

locating a sequence of actions matched with the operational intention in the voice-action list according to the voice-action description information; and delivering the sequence of actions to the terminal for performing.

Further, the embodiments of the present disclosure provide a view-based voice interaction method, which is applied to a terminal. The method comprises:

transmitting voice information of a user that is heard and voice-action description information of a voice-operable element in a currently displayed view on the terminal to a server, the voice-action description information including a voice-action list and configuration information of each voice-action in the voice-action list, and the voice-action being configured to describe a voice operation to be performed on an element in the view; and receiving a sequence of actions determined according to the voice information and the voice-action description information from the server, and performing action processing logics corresponding to the voice-actions in the sequence of actions.

Further, the embodiments of the present disclosure provide a view-based voice interaction apparatus, which is disposed on a server. The apparatus comprises:

a voice and action information obtaining module, configured to obtain voice information of a user and voice-action description information of a voice-operable element in a currently displayed view on a terminal, the voice-action description information including a voice-action list and configuration information of each voice-action in the voice-action list, and the voice-action being configured to describe a voice operation to be performed on an element in the view;

a semantic recognition module, configured to obtain operational intention of the user by performing semantic recognition on the voice information according to view description information of the voice-operable element;

an action-sequence determination module, configured to locate a sequence of actions matched with the operational intention in the voice-action list according to the voice-action description information; and an action delivery module, configured to deliver the sequence of actions to the terminal for performing.

Further, the embodiments of the present disclosure provide a view-based voice interaction apparatus disposed to a terminal. The apparatus comprises:

a voice and action information transmitting module, configured to transmit voice information of a user that is heard and voice-action description information of a voice-operable element in a currently displayed view on the terminal to a server, the voice-action description information including a voice-action list and configuration information of each voice-action in the voice-action list, and the voice-action being configured to describe a voice operation to be performed on an element in the view; and an action-sequence performing module, configured to receive a sequence of actions determined according to the voice information and the voice-action description information from the server, and to perform action processing logics corresponding to the voice-actions in the sequence of actions.

Further, the embodiments of the present disclosure provide a server, comprising:

one or more processors, and a storage device, configured to store one or more programs, wherein, when the one or more programs are executed by the one or more processors, the one or more processors are configured to implement the view-based voice interaction method according to any one of the embodiments of the present disclosure.

Further, the embodiments of the present disclosure provide a terminal, comprising:
one or more processors, and
a storage device, configured to store one or more programs,
wherein, when the one or more programs are executed by the one or more processors, the one or more processors are configured to implement the view-based voice interaction method according to any one of the embodiments of the present disclosure.

Further, the embodiments of the present disclosure provide a computer readable storage medium having a computer program stored thereon, wherein, when the program is executed by a processor, the program implements a view-based voice interaction method according to any one of the embodiments of the present disclosure.

Further, the embodiments of the present disclosure provide another computer readable storage medium having a computer program stored thereon, wherein, when the program is executed by a processor, the program implements a view-based voice interaction method according to any one of the embodiments of the present disclosure.

Other aspects of the present disclosure will be understood upon reading and understanding drawings and detailed description.

DETAILED DESCRIPTION

Hereinafter, the present disclosure will be described in detail with reference to the drawings and embodiments. It may be understood that specific embodiments described here are merely used to illustrate the present disclosure and are not intent to limit the present disclosure. In addition, it should be noted that only part of structures related to the present disclosure but not all the structures are illustrated in the drawings to facilitate the description.

Embodiment 1

Figure 1:
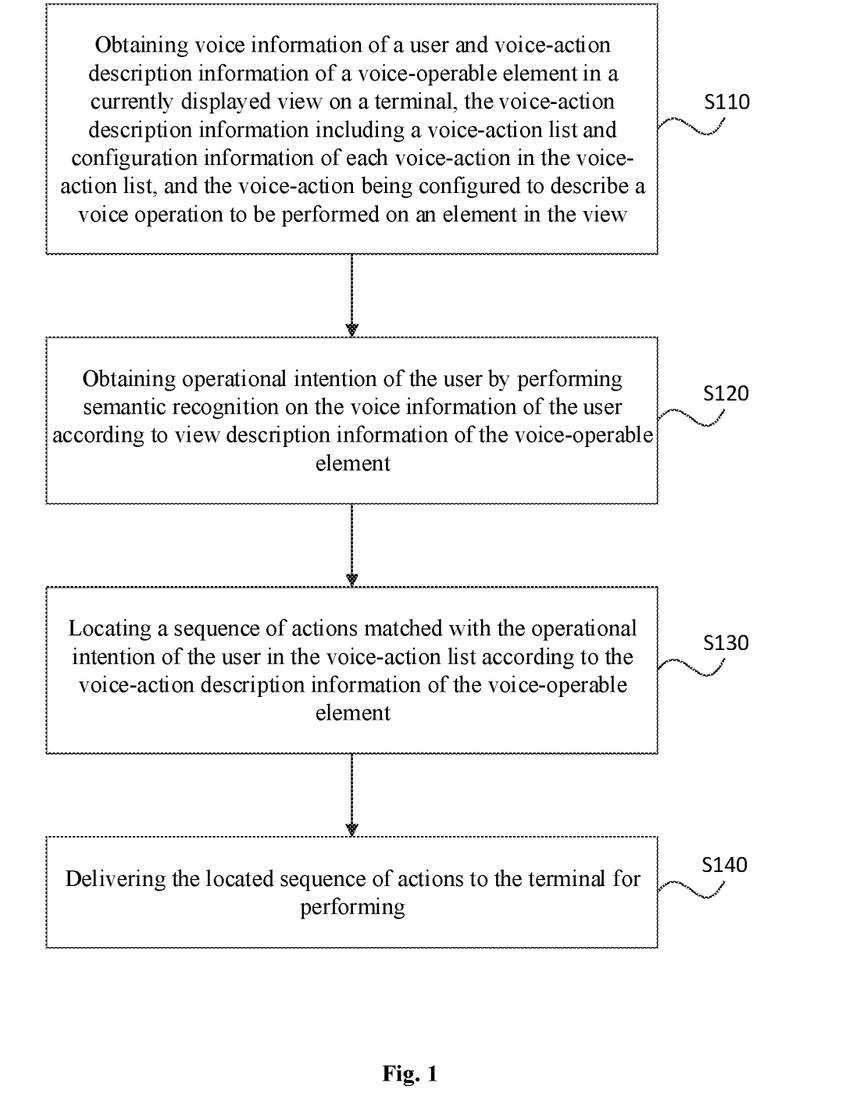
FIG. 1 is a flow chart of a view-based voice interaction method according to embodiment 1 of the present disclosure.

FIG. 1 is a flow chart of a view-based voice interaction method according to the embodiment 1 of the present disclosure. This embodiment is applicable to a case where the method is applied to a server to implement the view-based voice interaction. The method may be performed by a view-based voice interaction apparatus, which may be implemented in software and/or hardware and may be integrated in the server. As illustrated in FIG. 1, specifically, the method includes the following steps.

At step S110, voice information of a user and voice-action description information of a voice-operable element in a currently displayed view on a terminal are obtained. Here, the voice-action description information includes a voice-action list and configuration information of each voice-action in the voice-action list. The voice-action is configured to describe a voice operation to be performed on an element in the view.

The view in this embodiment includes a view on the terminal that may be operated with the user's voice. Elements displayed in the view include a voice-operable element and a non-voice-operable element. Accordingly, the voice-action is applied to the voice-operable element in the view, and is a core part that determines whether a view element can be operated.

The voice-action description information is voice interaction configuration information preset by a developer according to operations corresponding to the view element of the terminal based on a standardized speech programming language. In the view, each voice-operable element has a corresponding voice-action and associated configuration information. In this embodiment, the speech programming language is a computer program language specially developed by a developer to implement standardization and generality of the voice interaction function, mainly used for separating the voice interaction function from a view presentation logic, simplifying programming complexity of the voice interaction function, generalizing voice interaction processes and code logics of the voice interaction functions, providing a set of standards and basic frameworks for a product developer by packaging core technologies of the voice interaction, i.e., providing a set of generalized processes, enabling the product developer to achieve effects of quickly adding rich functionalities of the voice interaction on a view, such as a html view, an xml view or a jsx view based on a simple and practical advanced application programming interface (API).

The voice-action in the voice-action description information is used as an attribute of the view element, to describe a voice operation that may be performed by the user. The function of the voice-action may be expended through a script. Further, the voice-action is generic and may be combined with components in the view flexibly. Configuration information associated with the voice-action may be configured through a voice configuration (voice-config). The voice-action list in the voice-action description information refers to all the voice-actions in the currently displayed view, and may be collected and organized in a list.

At step S120, operational intention of the user is obtained by performing semantic recognition on the voice information of the user according to view description information of the voice-operable element.

The view description information of an element includes an element name related to a specific architecture of the view, a text label, and scene presentation information such as coordinate distribution of the element on the view. The server may perform semantic recognition on the voice information of the user according to the view description information of the element, and match key information in the user's voice with the element in the view to obtain the operational intention of the user that fits the currently displayed view.

At step S130, a sequence of actions matched with the operational intention of the user is located in the voice-action list according to the voice-action description information of the voice-operable element.

After the operational intention of the user is determined, a sequence of actions to be performed may be located by matching the operational intention of the user with the voice-action description information of the voice-operable element.

On the basis of the above technical solution, optionally, a voice label may be further included in the voice-action description information of the voice-operable element in the currently-displayed view on the terminal obtained by the server. Here, the voice label is configured to describe information about the voice-operable element in the view.

The voice label can be configured to assist in identifying and understanding the contents in the view, thereby retrieving a corresponding voice-action more accurately. Depending on the layout complexity of the view, a developer of a speech programming language may set the voice label adaptively. For example, for a simple view, there is a certain one-to-one relationship between a voice-action and an operation in the view. In this case, the voice label may be omitted. On the other hand, for a complex view, there may be a case where the same voice-action might correspond to different operation elements in the view. Accordingly, it may be necessary to provide the voice label. For example, when the user intends to purchase a ticket via voice with the voice information to buy a ticket from a place X to a place Y, he is required to input the source and destination in an address input box, and to select a departure time in a time box in the view, in either case of buying a train ticket or buying an airline ticket. The voice-actions corresponding to those operations are identical. Thus, the voice label may be used to distinguish the two cases. Specifically, when the user says that he wants to purchase an airline ticket, a specific voice-action to be performed for purchasing an airline ticket from the place X to the place Y may be located according to a voice label corresponding to an operable element for purchasing the airline ticket.

Further, there may also be cases in which the same voice-action corresponds to different operations over different views. For example, there may be a click operation corresponding to a voice-action of submission in both views B and K. However, the submission in the view B corresponds to a pause operation, while the submission in the view K corresponds to an operation of selecting from a list. In such a case, the developer may distinguish the functions of the voice-actions in different views by providing voice labels and adding corresponding voice-actions in the development of the voice interaction functions based on the speech programming language proposed in the embodiment. It is not necessary for the developer to developing the voice interaction functions for the view B and the view K separately, thereby reducing difficulty of developing the voice interaction functions, increasing generality of the voice interaction, and enabling a rapid expansion to different applications.

It should be noted that the conventional voice interaction is generally implemented by performing semantic recognition on the voice information input by the user and matching it with information of a controllable control object in a presented page, so as to trigger a corresponding operation in the page. Here, the controllable control object has not been implemented in association with a voice-action, and is not formed with a unified and standardized speech programming language. In particular, as for the data description for the voice-operable elements in the view, front-end development engineers and strategy development engineers need to cooperate to implement the corresponding data and contents of voice operations separately through codes, resulting in complicate upgrading and iteration.

In contrast, in this embodiment, the voice information input by the user is to be matched with voice-action description information of a view element that has been implemented in association with a voice-action. Here, the voice-action description information includes a voice-action configured based on a standardized speech programming language and configuration information thereof. In other words, in the embodiment, the server enables the voice information input by the user to be directly matched with a specific action and action configuration information of a view element that has been implemented in association with the voice-action, during an action matching process. Accordingly, it allows the developer to focus on the voice-action and action configuration information corresponding to the voice-operable element in the view without processing specific components in the view, thereby realizing decoupling between functions of the voice interaction and service logics of a product, and making it easy to maintain separately. It is clear from above that a conventional scheme does not involve such a decoupling function such that the developer needs to deal with view components while implementing the functions of the voice interaction function.

At step S140, the located sequence of actions is delivered to the terminal for performing.

The server delivers the sequence of actions that matches the operational intention of the user to the terminal, which in turn performs corresponding operations according to the received sequence of actions to complete the user's requirements.

The technical solution according to the embodiment is implemented based on a standardized speech programming language, comprising: obtaining voice information of a user and voice-action description information of a voice-operable element in a currently displayed view on a terminal; obtaining operational intention of the user by performing a semantic recognition on voice information of the user according to view description information of the voice-operable element; locating a sequence of actions matched with the operational intention of the user in the voice-action list; and delivering the sequence of actions to the terminal for performing. The embodiment solves problems such as high degree of coupling between the functions of voice interaction and the service logics of a product, lack of uniformity in the development of the functions of voice interaction, and poor generality. Further, the solution allows the developer to simply configure the voice-action description information of the voice-operable elements in the view, and particularly, to add voice-actions in the form of a label, during the development of the functions of voice interaction, which realizes the decoupling between the functions of voice interaction and the service logics of a product, and makes it easy to maintain separately. The solution may also implement unification and standardization of the development of the functions of voice interaction function, thereby improving the generality of the functions of voice interaction, and enabling a rapid expansion to different applications.

Embodiment 2

Figure 2:
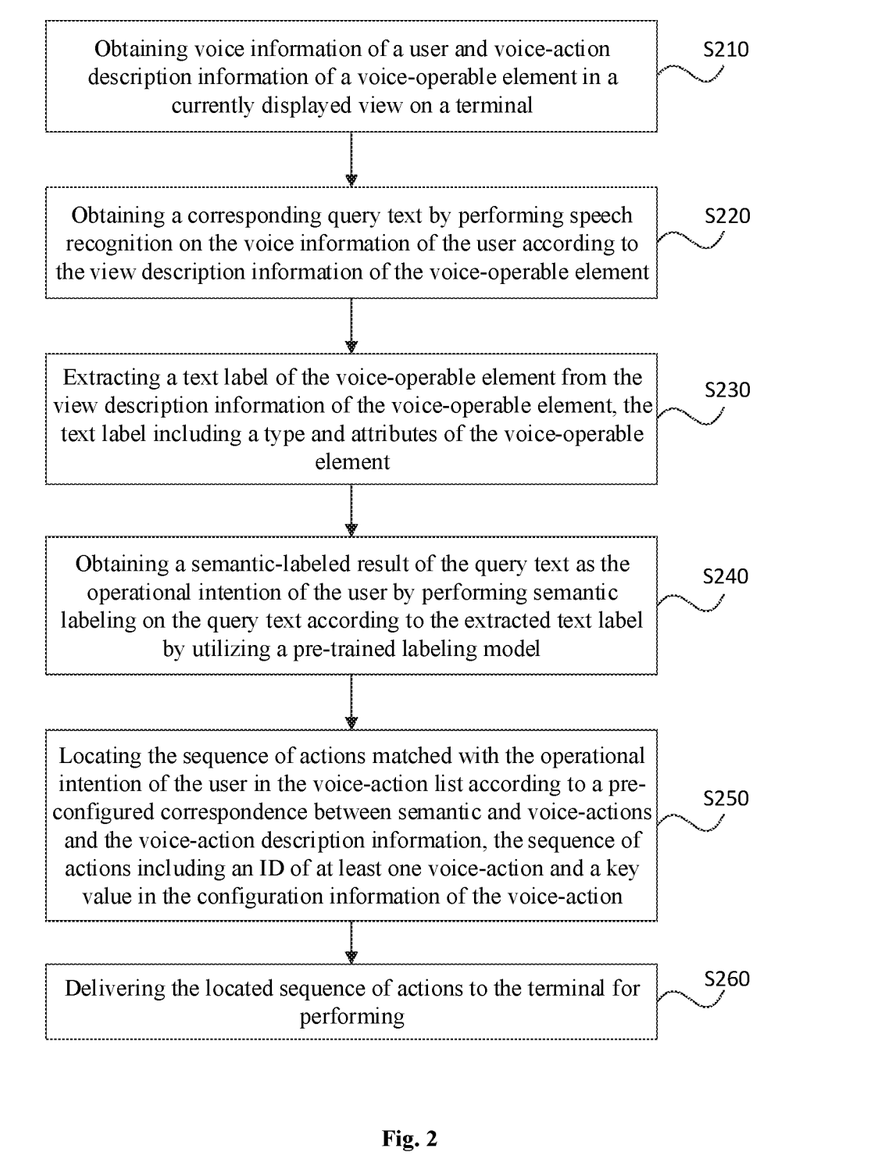
FIG. 2 is a flow chart of a view-based voice interaction method according to embodiment 2 of the present disclosure.

FIG. 2 is a flow chart of a view-based voice interaction method according to the embodiment 2 of the present disclosure. The embodiment is further optimized on the basis of the above embodiment. As illustrated in FIG. 2, specifically, the method includes the following steps.

At step S210, voice information of a user and voice-action description information of a voice-operable element in a currently displayed view on a terminal are obtained.

At step S220, a corresponding query text is obtained by performing speech recognition on the voice information of the user according to view description information of the voice-operable element.

Optionally, the above step of obtaining the corresponding query text by performing speech recognition on the voice information of the user according to the view description information of the voice-operable element to obtain a corresponding query text may include:

predicting acoustic features of an audio signal of the voice information of the user by utilizing a pre-trained acoustic model; and generating the corresponding query text by decoding the predicted acoustic features dynamically based on the view description information of the voice-operable element by utilizing a pre-trained language model.

Due to the richness of language, there are many cases in which the same pronunciation refers to different meanings. Therefore, decoding the acoustic features dynamically in combination with the view description information, i.e., decoding the acoustic features dynamically in combination with the architecture of the view and the relationship among respective elements in the view, allows for targeted recognition of the query text corresponding to the voice information, thereby recognizing the user's intention more precisely.

The server may generate the query text corresponding to the voice information of the user through feature prediction and dynamic decoding by utilizing the acoustic model and the language model, or may obtain the query text by using other speech recognition methods in the field, which is not limited in the embodiment. The acoustic model includes, but is not limited to, the Hidden Markov Model. Alternatively, the dynamic decoding may be implemented with a speech decoder.

At step S230, a text label of the voice-operable element is extracted from the view description information of the voice-operable element, the text label including a type and attributes of the voice-operable element.

Depending on the architecture of the view, the view elements may be classified into various types, and may be identified with different text labels. During the speech recognition on the voice information of the user, the server may extract the text label of the element at the same time, so as to semantically label the query text corresponding to the voice information of the user, which may assist in understanding the user's intention in combination with the content displayed in the view.

It should be noted that the order of execution of the operations S220 and S230 is not limited, as long as the query text corresponding to the voice information of the user and the text label of the element can be successfully obtained before the semantic labeling.

At step S240, a semantic-labeled result of the query text is obtained as the operational intention of the user by performing semantic labeling on the query text according to the extracted text label by utilizing a pre-trained labeling model.

During the semantic recognition, the acoustic model, the language model and the labeling model may be periodically updated to ensure the accuracy of semantic recognition. The server obtains the operational intention of the user by utilizing the labeling model, allowing the determination of the voice-action in the voice-action list.

At step S250, a sequence of actions matched with the operational intention of the user is located in the voice-action list according to a pre-configured correspondence between semantic and voice-actions and the voice-action description information, the sequence of actions including an ID of at least one voice-action and a key value in the configuration information of the voice-action.

During the development of the voice functions, the developer of the speech programming language pre-configures the correspondence between semantic and voice-actions. After the operational intention of the user is determined, the voice-actions may be located step by step by utilizing the correspondence and the voice-action description information of the voice-operable element in the view, resulting in the sequence of actions including the IDs of the voice-actions and key values of the action configuration information. The ID of the voice-action is a unique identifier of the voice-action, for example, for indicating the location of each voice-action in the sequence. The key values are used to indicating specific execution features corresponding to the voice-action. For example, a submission operation may involve cases of confirmation or cancellation, which corresponds to a voice-action of submitting and a key value of confirmation (OK) or cancel (cancel) in the action configuration information. As another example, a play operation of fast-forwarding to 2 minutes and 30 seconds corresponds to a voice-action of fast-forwarding and a key value of 2 minutes and 30 seconds in the action configuration information. As still another example, in a case where the content currently displayed in the view is a movie ranking list of an actor A, including the hottest list, the latest list and the best-reviewed list, the voice-actions in the view include three list-changing actions and respective key values of hottest, latest and best-reviewed in the action configuration information.

Optionally, the step of locating the sequence of actions may include:

determining a set of target voice-actions in the voice-action list by utilizing the pre-configured correspondence between semantic and voice-actions; and locating the sequence of actions matched with the operational intention of the user in the set of target voice-actions based on the voice-action description information, for example, the voice label and the key value in the action configuration information.

For example, in a main interface of a music player that is currently displayed in the view on the terminal, when the voice information input by the user is "to listen to songs such as 'Courage', 'Whole Life' and 'Begone Love'", first, the server determines that the voice-action corresponding to the operation of selecting a song in the current view is "selection" according to the identified operational intention of the user. Then, the server determines a set of target voice-actions including a plurality of song names according to a voice label "song list". In the set of target voice-actions, each song name corresponds to a sub-voice-action of selection. Then, the three song names 'Courage', 'Whole Life' and 'Begone Love' are used as the key values of the configuration information of the voice-action respectively, based on specific song names in the voice information of the user. Then, a sequence of voice-actions for selecting the three songs 'Courage', 'Whole Life' and 'Begone Love' may be determined in the set of target voice-actions. Alternatively, instead of determining the set of target voice-actions according to the voice label "song list", the server may determine the voice-actions for selecting specific song names one by one directly based on the song names in the voice information of the user, and then deliver the voice-actions to the terminal in a list.

At step S260, the located sequence of actions is delivered to the terminal for performing.

In the technical solution according to the embodiment, by obtaining voice information of a user and voice-action description information of a voice-operable element in a currently displayed view on a terminal, obtaining operational intention of the user by performing semantic recognition on the voice information of the user according to view description information of the voice-operable element, locating a sequence of actions matched with the operational intention of the user in the voice-action list, and delivering the sequence of actions to the terminal for performing, problems such as high degree of coupling between the functions of voice interaction and the service logics of a product, lack of uniformity in the development of the functions of voice interaction, and poor generality, may be solved, allowing the developer to simply configure the voice-action description information of the voice-operable elements in the view during the development of the functions of voice interaction, realizing the decoupling between the functions of voice interaction and the service logics of a product and making it easy to maintain separately. The solution may also implement the unification and standardization of the functions of voice interaction, thereby improving the generality of the functions of voice interaction and enabling a rapid expansion to different applications.

Embodiment 3

Figure 3:
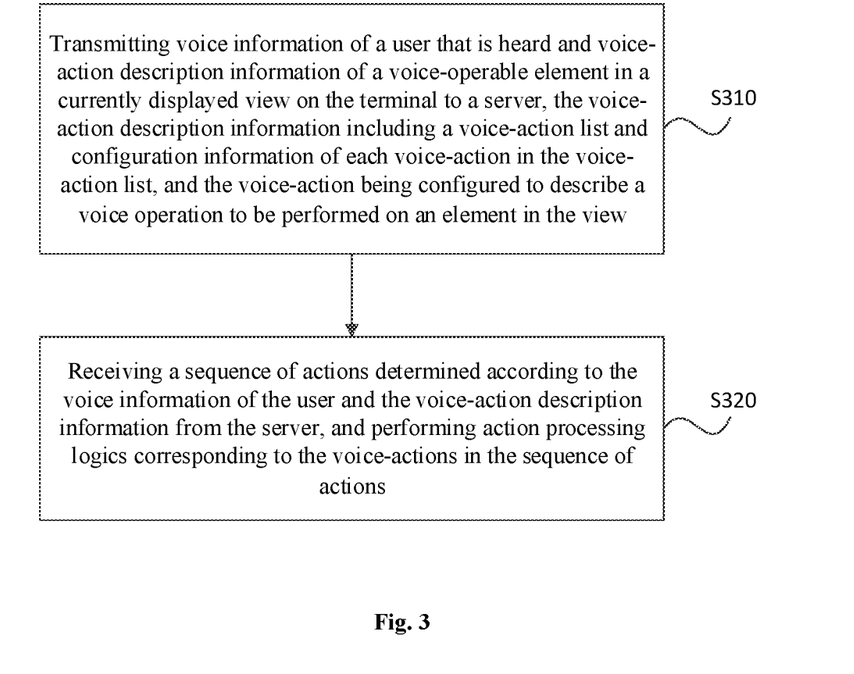
FIG. 3 is a flow chart of a view-based voice interaction method according to embodiment 3 of the present disclosure.

FIG. 3 is a flow chart of a view-based voice interaction method according to the embodiment 3 of the present disclosure. The embodiment is applicable to a case where the method is applied to a terminal to implement the view-based voice interaction, and may cooperate with the above view-based voice interaction method applied to the server in the above embodiment of the present disclosure. The method may be performed by a view-based voice interaction apparatus, which may be implemented in software and/or hardware and may be integrated in a terminal such as a mobile phone, a tablet computer, a personal computer and any other smart terminals. As illustrated in FIG. 3, specifically, the method includes the following steps.

At step S310, voice information of a user that is heard and voice-action description information of a voice-operable element in a currently displayed view on the terminal are transmitted to a server. Here, the voice-action description information includes a voice-action list and configuration information of each voice-action in the voice-action list. The voice-action is configured to describe a voice operation to be performed on an element in the view.

Alternatively, the voice-action description information may further include a voice label. Here, the voice label is configured to describe information about the voice-operable element in the view.

The terminal listens on the voice information of the user. Specifically, the terminal collects the voice information of the user through a microphone or an external sound collection device connected to the terminal or the like, and then transmits the voice information to the server. When a processor in the terminal heard a voice input event from the user, the processor transmits it to the server along with the voice-action description information of the voice-operable element in the currently displayed view. Information and data may be shared between the terminal and the server through network communication.

It should be noted that, when the terminal heard the voice information, the terminal needs to initialize the voice-action on the currently displayed view. The initialization process may include three steps of: voice object initialization, voice-action initialization, and voice-action data collection. For example, the voice object initialization may include listening on a voice input from the user, registering a voice object configuration, and initializing a voice object in the view page. The voice-action initialization may include parsing a document object model (DOM) of the view, constructing an action configuration, and initializing the action configuration. The voice-action data collection may include configuring a data providing action, constructing an action processor, and updating data information.

At step S320, a sequence of actions determined according to the voice information of the user and the voice-action description information is received from the server, and action processing logics corresponding to the voice-actions in the sequence of actions is performed.

After the server determines a matched sequence of actions by performing an action analysis according to the voice information of the user and the voice-action description information of the voice-operable element, the server delivers the sequence of actions to the terminal. The terminal receives this response from the server, and transmits the corresponding sequence of actions to an action router in the terminal. The action router decides the voice-action to be performed according to the sequence of actions, initializes corresponding voice-actions, and then performs corresponding action processing logics.

Optionally, performing the action processing logics corresponding to the voice-actions in the sequence of actions includes:

performing the action processing logics corresponding to the voice-actions in the sequence of actions, and obtaining voice events corresponding to the action processing logics and performing the voice events during performing the action processing logics, wherein the voice events are configured to define product logics to be processed during performing the voice-actions.

The voice events may be configured to define personalized product logics, such as how the voice-actions are performed or how the product is presented, according to specific action processing logics in the view. For example, in a case where the content currently displayed in the view is the hottest list in a movie ranking list of an actor A, which also includes the latest list and the best-reviewed list, the voice-actions in the view include three list-changing actions and respective key values of hottest, latest and best-reviewed in the configuration information of the list-changing actions. In such a case, when the voice information input by the user is to watch the second movie in the best-reviewed list of the actor A, the terminal switches the hottest list currently displayed to the best-reviewed list according to the received sequence of actions, and selects the second movie in the best-reviewed list for playing. Before playing, a poster of the second movie may be displayed with special effects according to a voice event related to the playing of the second movie, such as magnifying and highlighting an icon of the movie poster before playing the movie. Therefore, the voice events may be configured to increase the diversity and entertainments of the functions of voice interaction, improving the user's experience in using the product.

In the technical solution according to the embodiment, by transmitting voice information of a user that is heard and voice-action description information of a voice-operable element in a currently displayed view on the terminal to a server, receiving a sequence of actions determined according to the voice information of the user and the voice-action description information from the server, and performing corresponding action processing logics, problems such as high degree of coupling between the functions of voice interaction and the service logics of a product, lack of uniformity in the development of the functions of voice interaction, and poor generality, may be solved, which realizes the decoupling between the functions of voice interaction and the service logics of a product. The solution may also implement the standardization of the functions of voice interaction, thereby improving the generality of the functions of voice interaction and enabling a rapid expansion to different applications.

Embodiment 4

Figure 4:
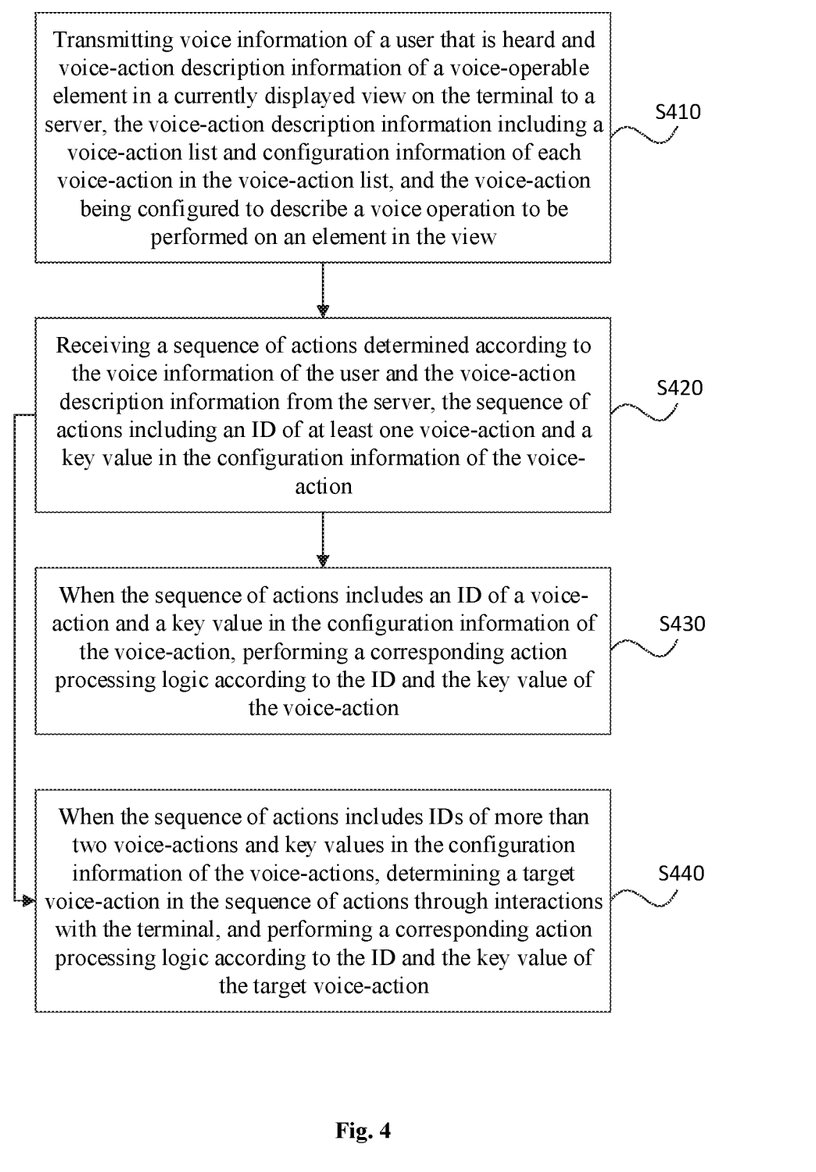
FIG. 4 is a flow chart of a view-based voice interaction method according to embodiment 4 of the present disclosure.

FIG. 4 is a flow chart of a view-based voice interaction method according to the embodiment 4 of the present disclosure. The embodiment is further optimized on the basis of the above embodiment. As illustrated in FIG. 4, specifically, the method includes the following steps.

At step S410, voice information of a user that is heard and voice-action description information of a voice-operable element in a currently displayed view on the terminal are transmitted to a server. Here, the voice-action description information includes a voice-action list and configuration information of each voice-action in the voice-action list. The voice-action is configured to describe a voice operation to be performed on an element in the view.

At step S420, a sequence of actions determined according to the voice information of the user and the voice-action description information is received from the server. Here, the sequence of actions includes an ID of at least one voice-action and a key value in the configuration information of the voice-action.

At step S430, when the sequence of actions includes an ID of a voice-action and a key value in the configuration information of the voice-action, a corresponding action processing logic is performed according to the ID and the key value.

When there is a one-to-one correspondence between the voice information input by the user and the voice-action corresponding to the voice-operable element, a unique voice-action may be matched according to the current voice information of the user without performing several interactions with the user. For example, if the voice information of the user is confirmation, which corresponds to a voice-action "submission" and a key value "confirmation (OK)" of the voice-action, the terminal performs a confirmation operation according to the submission action.

At step S440, when the sequence of actions includes IDs of more than two voice-actions and key values in the configuration information of the voice-actions, a target voice-action in the sequence of actions is determined through interactions with the terminal, and a corresponding action processing logic is performed according to the ID and the key value of the target voice-action.

When there is a one-to-many correspondence between the voice information input by the user and the voice-action corresponding to the voice-operable element, a final target voice-action may be determined through interactions between the user and the terminal. For example, if the voice information input by the user in the player view currently displayed is to listen to music, which corresponds to a voice-action "selection", a sequence of actions including voice-actions for playing several songs may be determined according to a voice label "song list". Then, the user is required to further input voice information relating to the song name R, so as to determine a voice-action for playing the song R that the user desires to listen to. As a result, the terminal plays the song R according to the voice-action.

In the technical solution according to the embodiment, by transmitting voice information of a user that is heard and voice-action description information of a voice-operable element in a currently displayed view on the terminal to a server, receiving a sequence of actions determined according to the voice information and the voice-action description information from the server, determining a target voice-action in the sequence of actions through interactions with the user according to the numbers of the actions included in the sequence of actions, and performing corresponding action processing logics, problems such as high degree of coupling between the functions of voice interaction and the service logics of a product, lack of uniformity in the development of the functions of voice interaction, and poor generality, may be solved, which realizes the decoupling between the functions of voice interaction and the service logics of a product. The solution may also implement the standardization of the functions of voice interaction, thereby improving the generality of the functions of voice interaction and enabling a rapid expansion to different applications.

Below, some examples of a view-based voice interaction apparatus according to the embodiments of the present disclosure will be described. The apparatus is linked with the view-based voice interaction method in the above embodiments by a general inventive concept. Some details of the view-based voice interaction apparatus that have been described above with respect to the embodiments of the view-based voice interaction method may be omitted below.

Embodiment 5

Figure 5:
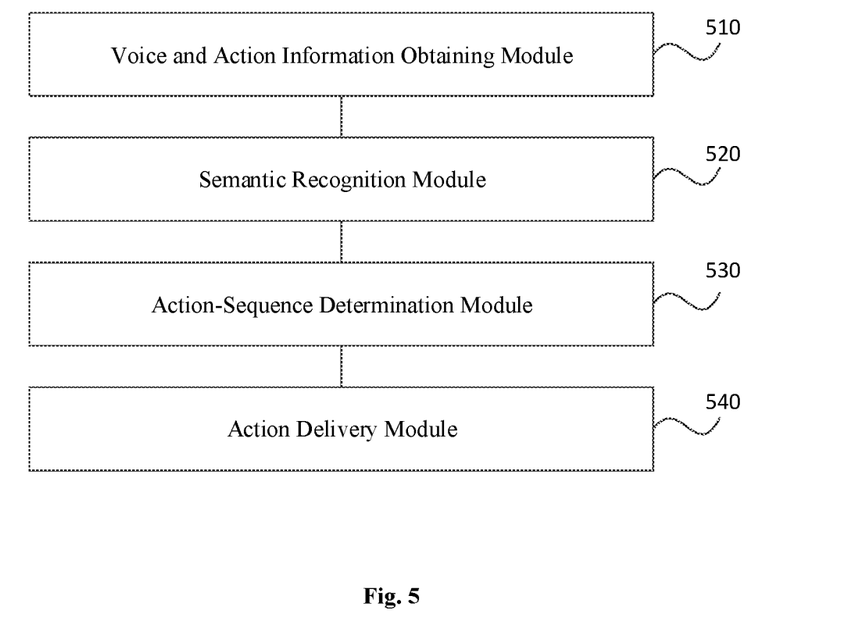
FIG. 5 is a schematic diagram of a view-based voice interaction apparatus according to embodiment 5 of the present disclosure.

FIG. 5 is a schematic diagram of a view-based voice interaction apparatus according to the embodiment 5 of the present disclosure. The apparatus may be disposed in a server. The embodiment is applicable to implement the view-based voice interaction. The view-based voice interaction apparatus according to the embodiment of the present disclosure may perform the view-based voice interaction method applied to the server according to any of the embodiments of the present disclosure, including respective functional modules for implementing the method and achieving corresponding beneficial effects. As illustrated in FIG. 5, specifically, the apparatus includes a voice and action information obtaining module 510, a semantic recognition module 520, an action-sequence determination module 530 and an action delivery module 540.

The voice and action information obtaining module 510 is configured to obtain voice information of a user and voice-action description information of a voice-operable element in a currently displayed view on a terminal. Here, the voice-action description information includes a voice-action list and configuration information of each voice-action in the voice-action list. The voice-action is configured to describe a voice operation to be performed on an element in the view.

Optionally, the voice-action description information obtained by the voice and action information obtaining module 510 may further include a voice label. Here, the voice label is configured to describe information about the voice-operable element in the view. The semantic recognition module 520 is configured to obtain operational intention of the user by performing semantic recognition on the voice information of the user according to view description information of the voice-operable element.

The action-sequence determination module 530 is configured to locating a sequence of actions matched with the operational intention of the user in the voice-action list according to the voice-action description information of the voice-operable element.

Optionally, the action-sequence determination module 530 is specifically configured to:

locate the sequence of actions matched with the operational intention of the user in the voice-action list according to a pre-configured correspondence between semantic and voice-actions and the voice-action description information. Here, the sequence of actions includes an ID of at least one voice-action and a key value in the configuration information of the voice-action.

The action delivery module 540 is configured to deliver the located sequence of actions to the terminal for performing.

On the basis of the above technical solution, optionally, the semantic recognition module 520 includes a query text determination unit, a text label extraction unit and an operational intention determination unit.

The query text determination unit is configured to obtain a corresponding query text by performing speech recognition on the voice information of the user according to the view description information of the voice-operable element.

The text label extraction unit is configured to extract a text label of the voice-operable element from the view description information of the voice-operable element. Here, the text label includes a type and attributes of the voice-operable element.

The operational intention determination unit is configured to obtain a semantic-labeled result of the query text as the operational intention of the user by performing semantic labeling on the query text according to the extracted text label by utilizing a pre-trained labeling model.

Optionally, the query text determination unit includes an acoustic feature prediction subunit and a text generation subunit.

The acoustic feature prediction subunit is configured to predict acoustic features of an audio signal of the voice information of the user by utilizing a pre-trained acoustic model.

The text generation subunit is configured to generate the corresponding query text by decoding the predicted acoustic features dynamically based on the view description information of the voice-operable element by utilizing a pre-trained language mode.

The technical solution according to the embodiment is implemented based on a standardized speech programming language, comprising: obtaining voice information of a user and voice-action description information of a voice-operable element in a currently displayed view on a terminal; obtaining operational intention of the user by performing semantic recognition on the voice information of the user according to view description information of the voice-operable element; locating a sequence of actions matched with the operational intention of the user in the voice-action list according to the voice-action description information of the voice-operable element; and delivering the located sequence of actions to the terminal for performing. The embodiment solves problems such as high degree of coupling between the functions of voice interaction and the service logics of a product, lack of uniformity in the development of the functions of voice interaction, and poor generality. Further, the solution allows the developer to simply configure the voice-action description information of the voice-operable elements in the view during the development of the functions of voice interaction, which realizes the decoupling between the functions of voice interaction and the service logics of a product, and makes it easy to maintain separately. The solution may also implement unification and standardization of the development of the functions of voice interaction function, thereby improving the generality of the functions of voice interaction and enabling a rapid expansion to different applications.

Embodiment 6

Figure 6:
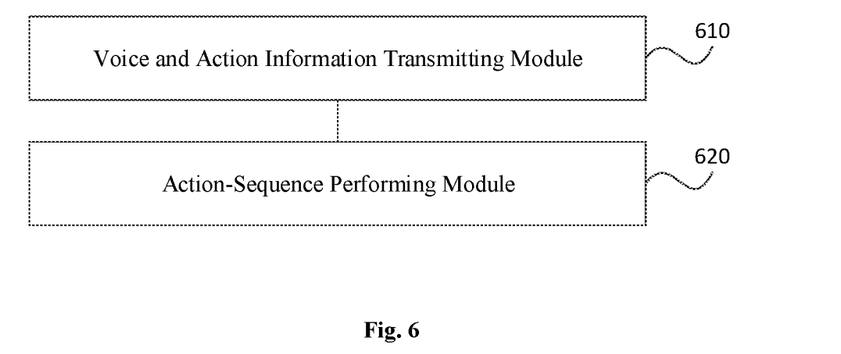
FIG. 6 is a schematic diagram of a view-based voice interaction apparatus according to embodiment 6 of the present disclosure.

FIG. 6 is a schematic diagram of a view-based voice interaction apparatus according to the embodiment 6 of the present disclosure. The apparatus may be disposed in a terminal. The embodiment is applicable to implement the view-based voice interaction. The view-based voice interaction apparatus according to the embodiment of the present disclosure may perform the view-based voice interaction method applied to the terminal according to any of the embodiments of the present disclosure, including respective functional modules for implementing the method, and achieving corresponding beneficial effects. As illustrated in FIG. 6, specifically, the apparatus includes a voice and action information transmitting module 610 and an action-sequence performing module 620.

The voice and action information transmitting module 610 is configured to transmit voice information of a user that is heard and voice-action description information of a voice-operable element in a currently displayed view on the terminal to a server. Here, the voice-action description information includes a voice-action list and configuration information of each voice-action in the voice-action list. The voice-action is configured to describe a voice operation to be performed on an element in the view.

Optionally, the voice-action description information transmitted by the voice and action information transmitting module 610 may further include a voice label. Here, the voice label is configured to describe information about the voice-operable element in the view.

The sequence of actions executing module 620 is configured to receive the sequence of actions determined according to the voice information of the user and the voice-action description information from the server, and to perform the action processing logics corresponding to the voice-action in the sequence of actions.

Optionally, the action-sequence performing module 620 includes a receiving unit and a performing unit.

The receiving unit is configured to receive the sequence of actions determined according to the voice information of the user and the voice-action description information from the server.

The performing unit is configured to perform the action processing logics corresponding to the voice-actions in the received sequence of actions.

Optionally, the performing unit is specifically configured:

to perform the action processing logics corresponding to the voice-actions in the sequence of actions, and to obtain voice events corresponding to the action processing logics and performing the voice events during performing the action processing logics, wherein the voice events are configured to define product logics to be processed during performing the voice-actions.

Optionally, the sequence of actions received by the action-sequence performing module 620 includes an ID of at least one voice-action and a key value in the configuration information of the voice-action.

Correspondingly, the performing unit includes a first performing subunit and a second performing subunit.

The first performing subunit is configured, when the sequence of actions includes an ID of a voice-action and a key value in the configuration information of the voice-action, to perform a corresponding action processing logic according to the ID and the key value of the voice-action.

The second performing subunit is configured, when the sequence of actions includes IDs of more than two voice-actions and key values in the configuration information of the voice-actions, to determine a target voice-action in the sequence of actions through interactions with the terminal, and to perform a corresponding action processing logic according to the ID and the key value of the target voice-action.

In the technical solution according to the embodiment, by transmitting voice information of a user that is heard and voice-action description information of a voice-operable element in a currently displayed view on the terminal to a server, and receiving a sequence of actions determined according to the voice information of the user and the voice-action description information from the server and performing action processing logics corresponding to the voice-actions in the sequence of actions, problems such as high degree of coupling between the functions of voice interaction and the service logics of a product, lack of uniformity in the development of the functions of voice interaction, and poor generality, may be solved, which realizes the decoupling between the functions of voice interaction and the service logics of a product. The solution may also implement the standardization of the functions of voice interaction, thereby improving the generality of the functions of voice interaction and enabling a rapid expansion to different applications.

Embodiment 7

Figure 7:
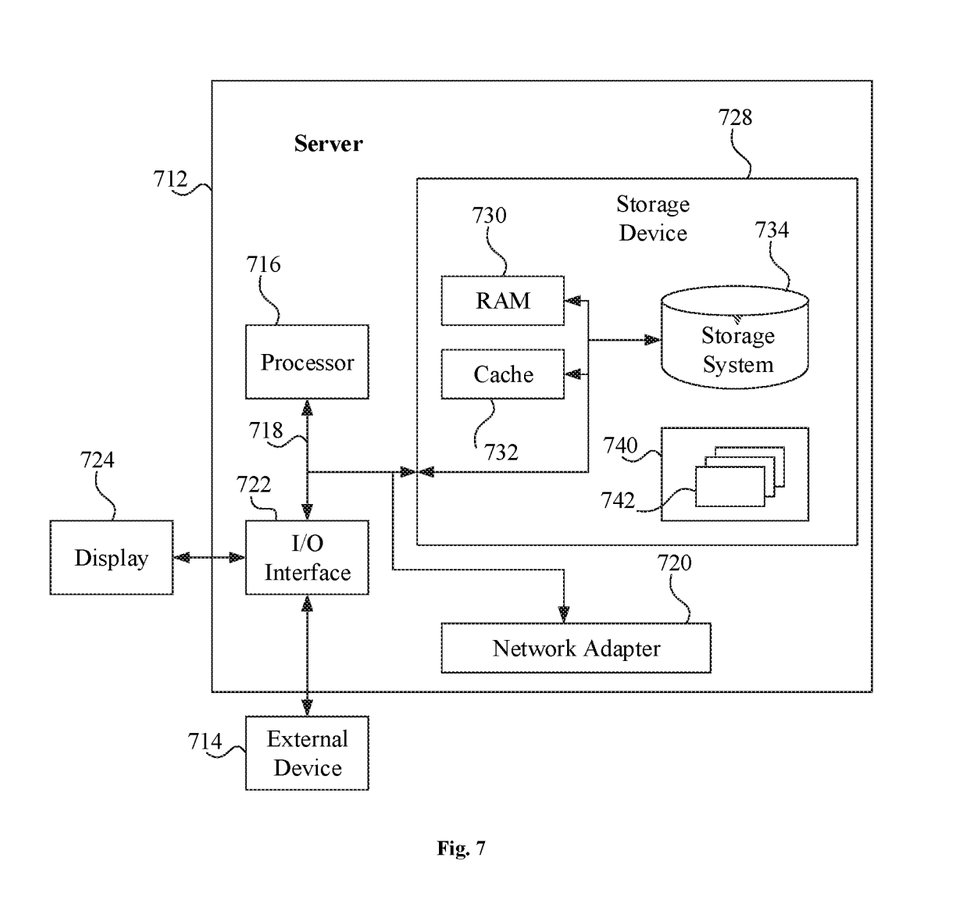
FIG. 7 is a schematic diagram of a server according to embodiment 7 of the present disclosure.

FIG. 7 is a schematic diagram of a server according to the embodiment 7 of the present disclosure. FIG. 7 illustrates a block diagram of an exemplary server 712 applicable for implementing an embodiment of the present disclosure. The server 712 shown in FIG. 7 is merely an example, and is not to impose any limitation on the function and usage of the embodiments of the present disclosure.

As illustrated in FIG. 7, the server 712 is implemented as a generic server. Components of the server 712 may include, but are not limited to, one or more processors 716, a storage device 728, and a bus 718 for connecting different system components (including the storage device 728 and the processors 716).

The bus 718 may be implemented as one or more bus architectures, including a storage device bus or a storage device controller, a peripheral bus, an accelerated graphics port, a processor, or a local bus with any of the bus architectures. For example, the bus architectures include, but are not limited to, an industry subversive alliance (ISA) bus, a micro channel architecture (MAC) bus, an enhanced ISA bus, a video electronics standards association (VESA) local bus and a peripheral component interconnect (PCI) bus.

The server 712 typically includes various computer system readable media. The media may be any available media that may be accessed by the server 712, including volatile and non-volatile media, removable and non-removable media.

The storage device 728 may include a computer system readable medium in the form of a volatile memory, such as a random access memory (RAM) 730 and/or a cache memory 732. The server 712 may further include other removable/non-removable and volatile/non-volatile computer system storage media. As an example only, a storage system 734 may be configured to read from or write to a non-removable and non-volatile magnetic medium (not shown in FIG. 7, and generally referred as a "hard disk drive"). Although not shown in FIG. 7, a magnetic-disk drive configured to read from or write to a removable and nonvolatile magnetic disk (for example, a "floppy disk"), and an optical-disk drive configured to read from or write to a removable and nonvolatile optical disk, such as a compact disc read-only memory (CD-ROM), a digital video disc-read only memory (DVD-ROM), or other optical media, may be provided. In those cases, each drive may be connected to the bus 718 through one or more data medium interfaces. The storage device 728 may include at least one program product having a set of (e.g., at least one) program modules configured to perform functions in respective embodiments of the present disclosure.

A program/utility 740 having a set of (at least one) program modules 742 may be stored, for example, in the storage device 728. The program modules 742 include, but are not limited to, an operation system, one or more applications, other program modules and program data. Each of the examples or a certain combination thereof may include an implementation of a network environment. The program module 742 typically performs the functions and/or methods in the embodiments described in the disclosure.

Further, the server 712 may communicate with one or more external devices 714, such as a keyboard, a pointing device and a display 724, and may also communicated with one or more terminals that enable the user to interact with the server 712, and/or communicate with any terminals, such as a network card and a modem, that enable the server 712 to communicate with one or more other computer terminals. Such communication may be implemented through an input/output (I/O) interface 722. In addition, the server 712 may also communicate with one or more networks, such as a local area network (LAN), a wide area network (WAN), and/or a public network such as the Internet, through a network adapter 720. As shown in FIG. 7, the network adapter 720 may communicates with other modules in the server 712 through the bus 718. It should be understood that, although not shown in the drawings, other hardware and/or software modules may be utilized in combination with the server 712, including but not limited to: a microcode, a terminal driver, a redundant processor, external disk drive arrays, a redundant-arrays-of-independent-disks (RAID) system, a tape drive, and a data backup storage system.

The processor 716 performs various functional applications and data processing by running programs stored in the storage device 728, for example, for implementing the view-based voice interaction method applied to the server according to the embodiments of the present disclosure. The method comprises:

obtaining voice information of a user and voice-action description information of a voice-operable element in a currently displayed view on a terminal, the voice-action description information including a voice-action list and configuration information of each voice-action in the voice-action list, and the voice-action being configured to describe a voice operation to be performed on an element in the view;

obtaining operational intention of the user by performing semantic recognition on the voice information of the user according to view description information of the voice-operable element;

locating a sequence of actions matched with the operational intention of the user in the voice-action list according to the voice-action description information of the voice-operable element; and delivering the located sequence of actions to the terminal for performing.

Embodiment 8

Figure 8:
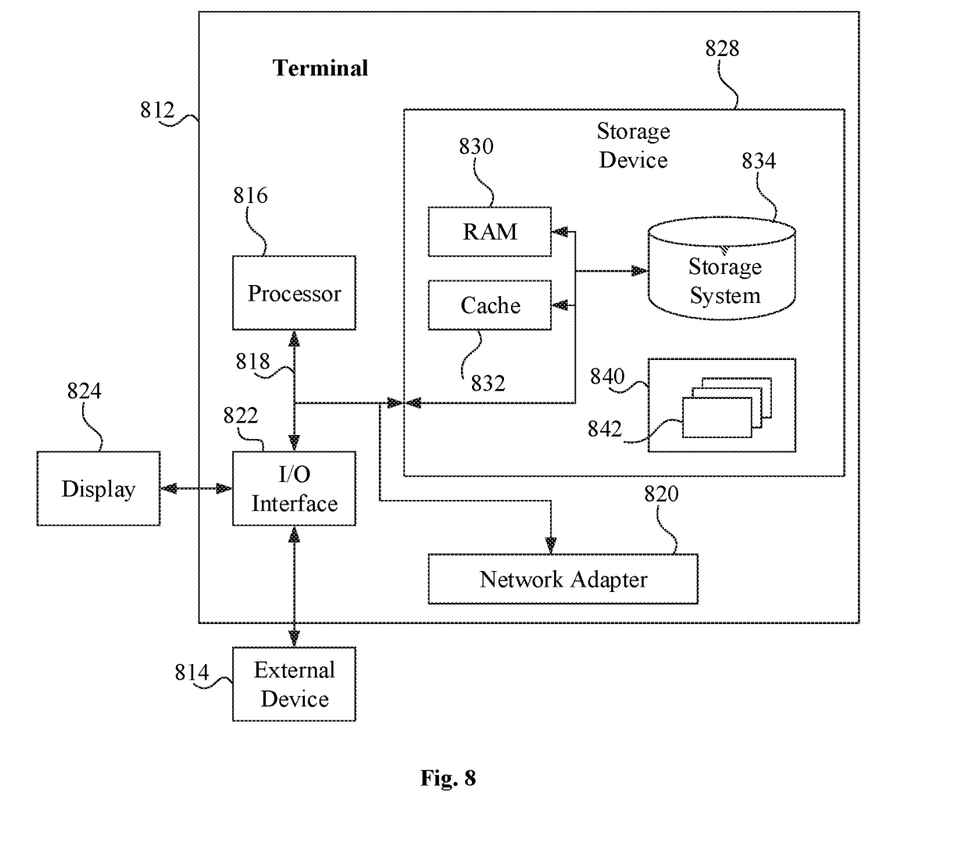
FIG. 8 is a schematic diagram of a terminal according to embodiment 8 of the present disclosure.

FIG. 8 is a schematic diagram of a terminal according to the embodiment 8 of the present disclosure. FIG. 8 illustrates a block diagram of an exemplary terminal 812 applicable for implementing an embodiment of the present disclosure. The terminal 812 shown in FIG. 8 is merely an example, and is not to impose any limitation on the function and usage of the embodiments of the present disclosure.

As illustrated in FIG. 8, the terminal 812 is implemented as a generic terminal. Components of the terminal 812 may include, but are not limited to, one or more processors 816, a storage device 828, and a bus 818 for connecting different system components (including the storage device 828 and the processor 816).

The bus 818 may be implemented as one or more bus architectures, including a storage device bus or a storage device controller, a peripheral bus, an accelerated graphics port, a processor, or a local bus with any of the bus architectures. For example, the bus architectures may include, but are not limited to, an industry subversive alliance (ISA) bus, a micro channel architecture (MAC) bus, an enhanced ISA bus, a video electronics standards association (VESA) local bus and a peripheral component interconnect (PCI) bus.

The terminal 812 typically includes various computer system readable media. The media may be any available media that may be accessed by the terminal 812, including volatile and non-volatile media, removable and non-removable media.

The storage device 828 may include a computer system readable medium in the form of a volatile memory, such as a random access memory (RAM) 830 and/or a cache memory 832. The terminal 812 may further include other removable/non-removable and volatile/non-volatile computer system storage media. As an example only, a storage system 834 may be configured to read from or write to a non-removable and non-volatile magnetic medium (not shown in FIG. 8, and generally referred as a "hard disk drive"). Although not shown in FIG. 8, a magnetic-disk drive configured to read from or write to a removable and nonvolatile magnetic disk (for example, a "floppy disk"), and an optical-disk drive configured to read from or write to a removable and nonvolatile optical disk, such as a compact disc read-only memory (CD-ROM), a digital video disc-read only memory (DVD-ROM), or other optical media, may be provided. In those cases, each drive may be connected to the bus 818 through one or more data medium interfaces. The storage device 828 may include at least one program product having a set of (e.g., at least one) program modules configured to perform functions in respective embodiments of the present disclosure.

A program/utility 840 having a set of (at least one) program modules 842 may be stored, for example, in the storage device 828. The program modules 842 include, but are not limited to, an operation system, one or more applications, other program modules and program data. Each of the examples or a certain combination thereof may include an implementation of a network environment. The program module 842 typically performs the functions and/or methods in the embodiments described in the disclosure.

Further, the terminal 812 may communicate with one or more external devices 814, such as a keyboard, a pointing device and a display 824, and may also communicated with one or more terminals that enable the user to interact with the terminal 812, and/or communicate with any terminals, such as a network card and a modem, that enable the terminal 812 to communicate with one or more other computer terminals. Such communication may be implemented through an input/output (I/O) interface 822. In addition, the terminal 812 may communicate with one or more networks, such as a local area network (LAN), a wide area network (WAN), and/or a public network, such as the Internet, through a network adapter 820. As shown in FIG. 8, the network adapter 820 may communicate with other modules of the terminal 812 through the bus 818. It should be understood that, although not shown in the drawings, other hardware and/or software modules may be utilized in combination with the terminal 812, including but not limited to: a microcode, a terminal driver, a redundant processor, external disk drive arrays, a redundant-arrays-of-independent-disks (RAID) system, a tape drive, and a data backup storage system.

The processor 816 performs various functional applications and data processing by running programs stored in the storage device 828, for example, for implementing the view-based voice interaction method applied to the terminal according to the embodiments of the present disclosure. The method comprises:

transmitting voice information of a user that is heard and voice-action description information of a voice-operable element in a currently displayed view on the terminal to a server, the voice-action description information including a voice-action list and configuration information of each voice-action in the voice-action list, and the voice-action being configured to describe a voice operation to be performed on an element in the view; and receiving a sequence of actions determined according to the voice information of the user and the voice-action description information from the server, and performing action processing logics corresponding to the voice-actions in the sequence of actions.

Embodiment 9

Further, the embodiment 9 of the present disclosure provides a computer readable storage medium having a computer program stored thereon. When the program is executed by a processor, the program implements a view-based voice interaction method applied to a server according to the embodiments of the present disclosure. The method comprises:

obtaining voice information of a user and voice-action description information of a voice-operable element in a currently displayed view on a terminal, the voice-action description information including a voice-action list and configuration information of each voice-action in the voice-action list, and the voice-action being configured to describe a voice operation to be performed on an element in the view;

obtaining operational intention of the user by performing semantic recognition on the voice information of the user according to view description information of the voice-operable element;

locating a sequence of actions matched with the operational intention of the user in the voice-action list according to the voice-action description information of the voice-operable element; and delivering the located sequence of actions to the terminal for performing.

The computer storage medium according to the embodiments of the present disclosure may adopt any combination of one or more computer readable media. The computer readable medium may be a computer readable signal medium or a computer readable storage medium. The computer readable storage medium may be, for example, but not limited to, electronic, magnetic, optical, electromagnetic, infrared, or semiconducting system, apparatus, or device, or any combination of them. More specifically, but not listed exhaustively, examples of the computer readable storage medium may include: an electrical connection with one or more wires, a portable computer disk, a hard disk, a random access memory (RAM), a read only memory (ROM), an erasable programmable read only memory (EPROM or a flash memory), an optical fiber, a portable compact disk-read only memory (CD-ROM), an optical storage device, a magnetic storage device, or any suitable combination of them. In this application, a computer readable storage medium may be any tangible medium that contains or stores a program to be utilized by or in connection with an instruction execution system, apparatus, or device.

A computer readable signal medium may include a data signal that is propagated in a baseband or as part of a carrier, carrying computer readable program codes. The data signal propagated in this manner may adopt a plurality of forms including, but not limited to, an electromagnetic signal, an optical signal, or any suitable combination thereof. The computer readable signal medium may also be any computer readable medium other than a computer readable storage medium. The computer readable medium may send, propagate, or transmit a program to be utilized by or in connection with an instruction execution system, apparatus, or device.

Program codes contained in the computer readable medium may be transmitted over any suitable media, including but not limited to a wireless connection, a wired connection, a fiber optic cable, RF, or any suitable combination thereof.

Computer program codes for performing the operations of the present disclosure may be written in one or more programming languages, or a combination thereof. The programming languages may include an object-oriented programming language such as Java, Smalltalk, C++, and conventional procedural programming languages such as the C language or the like. The program codes may be entirely executed on the user's computer, partly executed on the user's computer, executed as a stand-alone software package, executed partly on the user's computer and partly on a remote computer, or entirely executed on the remote computer or terminal. In a case involving the remote computer, the remote computer may be connected to the user's computer through any kind of network, including a local area network (LAN) or a wide area network (WAN), or may be connected to an external computer, for example, through the Internet provided by an Internet service provider.

Further, the embodiments of the present disclosure provide another computer readable storage medium having a computer program stored thereon. When the program is executed by a processor, the program may implement a view-based voice interaction method applied to a terminal, comprising:

transmitting voice information of a user that is heard and voice-action description information of a voice-operable element in a currently displayed view on the terminal to a server, the voice-action description information including a voice-action list and configuration information of each voice-action in the voice-action list, and the voice-action being configured to describe a voice operation to be performed on an element in the view; and receiving a sequence of actions determined according to the voice information of the user and the voice-action description information from the server, and performing action processing logics corresponding to the voice-actions in the sequence of actions.

Of course, a computer program in a computer readable storage medium according to an embodiment of the present disclosure is not limited to the operations as described above, and may perform relevant operations of the view-based voice interaction method applied to the terminal according to any embodiment of the present disclosure. For an introduction to the storage medium, reference may be made to the explanation in Embodiment 9.

It should be noted that although the present disclosure has been described in detail above with reference to the embodiments, the present disclosure is not limited to the above embodiments, and other equivalent embodiments may be included without departing from the spirit of the present disclosure. The extent of the present application is to be determined by the attached claims.

What is claimed is:

1. A view-based voice interaction method, which is applied to a server, comprising:

obtaining voice information of a user and voice-action description information of a voice-operable element in a currently displayed view on a terminal;

obtaining operational intention of the user by performing semantic recognition on the voice information according to view description information of the voice-operable element, in which the view description information comprises an element name, a text label, and coordinate distribution of the voice-operable element in the view;

locating a sequence of actions matched with the operational intention in the voice-action list according to the voice-action description information;

and delivering the sequence of actions to the terminal for performing;

wherein the voice-action description information comprises a list of voice actions, a voice label of each voice action, and configuration information of each voice action, in which     each voice action is configured to describe a voice operation to be performed on the voice-operable element in the view,     the configuration information of each voice action is configured to indicate specific execution features corresponding to each voice action,     and the voice label of each voice action is configured to describe information about the voice-operable element in the view, and to identify a different function operation of the same voice action in a different view;

wherein said obtaining operational intention of the user comprises:

predicting acoustic features of an audio signal of the voice information by utilizing a pre-trained acoustic model, and generating a corresponding query text by decoding the acoustic features dynamically with a pre-trained language model based on an architecture of the view and a relationship among respective voice-operable elements in the view.

2. The method according to claim 1, wherein said obtaining the operational intention of the user further includes:
extracting a text label of the voice-operable element from the view description information of the voice-operable element, the text label including a type and attributes of the voice-operable element; and
obtaining a semantic-labeled result of the query text as the operational intention of the user by performing semantic labeling on the query text according to the extracted text label by utilizing a pre-trained labeling model.

3. The method according to claim 1, wherein locating the sequence of actions matched with the operational intention in the voice-action list according to the voice-action description information, includes:
determining a set of target voice-actions in the voice-action list based on a pre-configured correspondence between semantic intentions and voice-actions; and
locating the sequence of actions matched with the operational intention in the set of target voice-actions based on the configuration information of each voice-action, the sequence of actions including an ID of at least one voice-action and a key value in the configuration information of the voice-action.

4. A view-based voice interaction method, which is applied to a terminal, comprising:
transmitting voice information of a user that is heard and voice-action description information of a voice-operable element in a currently displayed view on the terminal to a server; and
receiving a sequence of actions determined according to the voice information, view description information of the voice-operable element, and the voice-action description information from the server, and performing action processing logics corresponding to the voice-actions in the sequence of actions, in which the view description information comprises an element name, a text label, and coordinate distribution of the voice-operable element in the view;
wherein the voice-action description information comprises a list of voice actions, a voice label of each voice action, and configuration information of each voice action, in which
each voice action is configured to describe a voice operation to be performed on the voice-operable element in the view,
the configuration information of each voice action is configured to indicate specific execution features corresponding to each voice action, and
the voice label of each voice action is configured to describe information about the voice-operable element in the view, and to identify a different function operations of the same voice action in a different views;
wherein the server is configured to predict acoustic features of an audio signal of the voice information by utilizing a pre-trained acoustic model, and generate a corresponding query text by decoding the acoustic features dynamically with a pre-trained language model based on an architecture of the view and a relationship among respective voice-operable elements in the view.

5. The method according to claim 4, wherein the sequence of actions includes an ID of at least one voice-action and a key value in the configuration information of the voice-action, and
performing the action processing logics corresponding to the voice-actions in the sequence of actions, includes:
when the sequence of actions includes an ID of a voice-action and a key value in the configuration information of the voice-action, performing a corresponding action processing logic according to the ID and the key value; and
when the sequence of actions includes IDs of more than two voice-actions and key values in the configuration information of the voice-actions, determining a target voice-action in the sequence of actions through interactions with the terminal, and performing a corresponding action processing logic according to the ID and the key value of the target voice-action.

6. The method according to claim 4, wherein performing the action processing logics corresponding to the voice-actions in the sequence of actions, includes:
performing the action processing logics corresponding to the voice-actions in the sequence of actions, and
obtaining voice events corresponding to the action processing logics and performing the voice events during performing the action processing logics,
wherein the voice events are configured to define product logics to be processed during performing the voice-actions.

7. A view-based voice interaction apparatus, comprising:
one or more processors, and
a storage device, configured to store one or more programs,
wherein, when the one or more programs are executed by the one or more processors, the one or more processors are configured to implement a view-based voice interaction method, which is applied to a server, comprising:
obtaining voice information of a user and voice-action description information of a voice-operable element in a currently displayed view on a terminal;
obtaining operational intention of the user by performing semantic recognition on the voice information according to view description information of the voice-operable element, in which the view description information comprises an element name, a text label, and coordinate distribution of the element in the view;
locating a sequence of actions matched with the operational intention in the voice-action list according to the voice-action description information; and
delivering the sequence of actions to the terminal for performing;
wherein the voice-action description information comprises a list of voice actions, a voice label of each voice action, and configuration information of each voice action, in which
each voice action is configured to describe a voice operation to be performed on the voice-operable element in the view,
the configuration information of each voice action is configured to indicate specific execution features corresponding to each voice action, and
the voice label of each voice action is configured to describe information about the voice-operable element in the view, and to identify a different function operations of the same voice action in a different views;

wherein said obtaining operational intention of the user comprises:
predicting acoustic features of an audio signal of the voice information by utilizing a pre-trained acoustic model, and generating a corresponding query text by decoding the acoustic features dynamically with a pre-trained language model based on an architecture of the view and a relationship among respective voice-operable elements in the view.

8. The apparatus according to claim 7, wherein when the one or more processors are configured to obtain the operational intention of the user by performing the semantic recognition on the voice information according to the view description information of the voice-operable element, the one or more processors are further configured to:
extract a text label of the voice-operable element from the view description information of the voice-operable element, the text label including a type and attributes of the voice-operable element; and
obtain a semantic-labeled result of the query text as the operational intention of the user by performing semantic labeling on the query text according to the extracted text label by utilizing a pre-trained labeling model.

9. The apparatus according to claim 7, wherein when the one or more processors are configured to locate the sequence of actions matched with the operational intention in the voice-action list according to the voice-action description information, the one or more processors are further configured to:
determine a set of target voice-actions in the voice-action list based on a pre-configured correspondence between semantic intentions and voice-actions; and
locate the sequence of actions matched with the operational intention in the set of target voice-actions based on the configuration information of each voice-action, the sequence of actions including an ID of at least one voice-action and a key value in the configuration information of the voice-action.

* * * * *